UNITED STATES PATENT OFFICE.

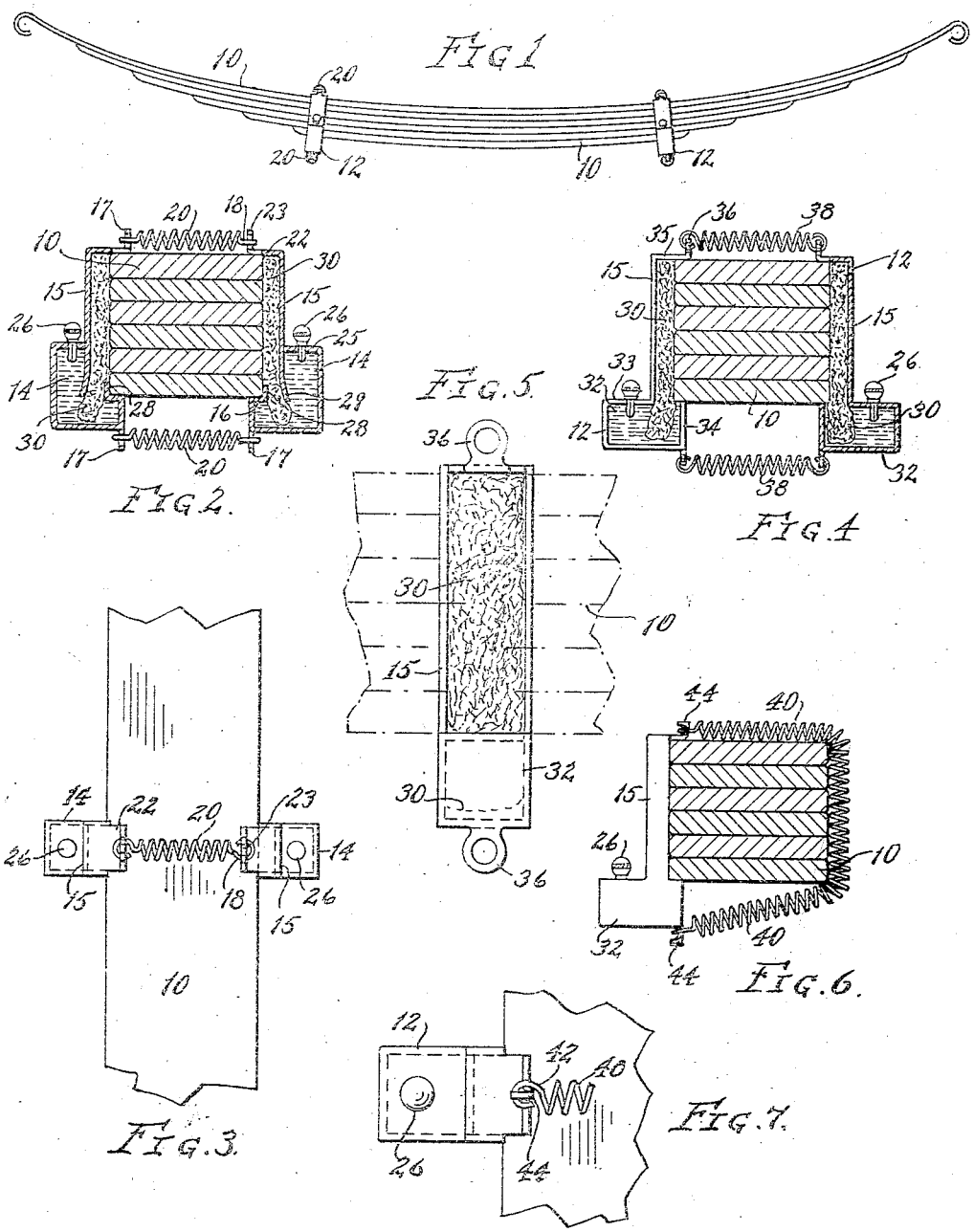

ALBERT MUSTEE, OF LAKEWOOD, OHIO.

LEAF-SPRING LUBRICATOR.

1,167,918.

Specification of Letters Patent. Patented Jan. 11, 1916.

Application filed January 23, 1915. Serial No. 3,967.

*To all whom it may concern:*

Be it known that I, ALBERT MUSTEE, a citizen of the United States, residing at Lakewood, in the county of Cuyahoga and State of Ohio, have invented a certain new and useful Improvement in Leaf-Spring Lubricators, of which the following is a full, clear, and exact description, reference being had to the accompanying drawings.

This invention relates to devices for introducing lubricant between the leaves of springs such as are commonly used on vehicles.

My invention has for its objects the provision of a simple, efficient oiler which shall feed only such lubricant to the springs as is necessary, thereby preventing waste and obviating the frequent refilling of the lubricating devices; the provision of securing means which will hold the device in position unaffected by the relative movement of the leaves of the spring while allowing ready attachment and removal; and the arrangement of the device so that it may be cheaply manufactured and may have a neat and pleasing appearance when in position for use.

My invention is hereinafter more fully described in connection with the drawings, and the essential characteristics are set forth in the claims.

Figure 1 is a side elevation of a vehicle spring, showing my device as mounted in position thereon; Fig. 2 is a transverse section through the spring and a pair of my lubricating devices mounted in position; Fig. 3 is a plan of the same; Fig. 4 is a transverse section through the spring and my oiling devices, showing a modified construction; Fig. 5 is an enlarged elevation of the device, showing the side which rests against the side of the spring; Fig. 6 is a transverse section through a spring, showing the method of attaching a single device at one side of the spring; Fig. 7 is a plan of the latter form of the device on the same scale as Fig. 5.

Referring to the drawings by reference numerals, 10 indicates a common form of leaf spring used on vehicles, such as automobiles and the like; 12 indicates my lubricating device mounted thereon.

The device comprises a reservoir 14 adapted to stand adjacent the lower portion of the spring and shown as having sides, top and bottom, and having an opening communicating with an upwardly extending conduit 15. This conduit extends over the sides of the leaves of the spring, and has an open side, closed by the edges of the leaves. The reservoir 14 preferably extends below the lower leaf and under the same, providing a shoulder, as at 16. Extending downwardly from the inner side of the reservoir is provided a projecting ear 17, approximately T-shaped, adapted to receive the eye 18 of a spring 20. The upper portion of the conduit 15 is closed by a top member 22 extending over the upper leaf and turned upwardly, forming an ear 23, also substantially T-shaped, adapted to have its shank embraced by a similar eye 18 of another spring 20.

As shown in Fig. 2, the reservoir extends upwardly past some of the lower leaves, having in its top 25, an opening adapted to be closed by a plug 26. This plug comprises a split shank, the lower end of which is adapted to spread to hold the plug in position, and is preferably made integral with a suitable knob adapted to be grasped by the fingers, for removal.

In order to prevent the lubricant (which is usually an oil) within the reservoir, from leaking past the lower leaves of the spring, and thus being wasted, the portion forming the shoulder 16 is extended upwardly as at 28, overlapping a portion of the lower leaf, and within the reservoir I have provided a downwardly extending partition 29 between the sides of the reservoir and having its lower edge extending below the portion 28. Accordingly, any oil escaping from the reservoir must flow upwardly between the portions 28 and 29. The conduit 15 is preferably filled with a suitable wick 30, extending from the top of the same substantially to the bottom of the reservoir and tightly filling the opening between the portions 16 and 28.

It will be seen that while there is any oil in the reservoir it will flow upwardly along the wick, and that it will work its way between the leaves of the spring as it is needed, thereby constantly lubricating the spring; but by reason of the action of the wick, it will not flow fast enough to cause waste of the lubricant.

It is frequently desirable to arrange these devices in pairs as shown in Figs. 2 to 4, and they may be conveniently held in position by pairs of springs extending between the projecting ears 17 drawing each lubricating device tightly against the sides of the spring. By securing the devices in position with springs yieldingly pressing them into engagement with the leaf spring to be lubricated, the devices are prevented from being shifted along the leaf spring by the relative movement of the leaves of the spring on each other. This relative movement which occurs whenever the leaf spring acts, makes it difficult to secure the devices by such securing means as bolts, screws, and the like, without danger of the devices shifting and becoming loosened, or without interfering with the free movement of the leaf spring. The use of these springs, however, securely holds them in this position, while allowing for ready removal and replacement when desired.

In the form shown in Fig. 4, the reservoir 32 corresponding to the reservoir 14 stands below the spring, and the top 33 of the reservoir is substantially on the level with or slightly below the lower edge of the lower leaf. The upper side of the reservoir communicates with the open sided conduit 15, the same as in the form described. With this construction, even when the reservoir is full, there is no tendency for oil to flow upwardly through the opening except through the capillary action of the wick 30. Accordingly, the lubricant will not be wasted. The inner side 34 of the reservoir 32, stands beneath the lower leaf, as shown, and the upper edge of this side abuts this leaf, while the top 35 of the conduit member is extended over the upper leaf and turned upwardly, the same as in the form described. Except in this figure and in Fig. 5, the ears 36 corresponding to the projections 17, are in the form of eyelets adapted to receive the hooked end of springs 38, to hold these devices in position, as described.

It is sometimes desirable to provide only one of the lubricating devices at a given position on the spring. In such a case, I prefer to use a single coil spring 40, illustrated in Fig. 6, extending around the opposite side of the spring 10 and having its hooked ends 42 engaging hooked projections 44, formed on the oiling device in substantially the same position as the projections 17 and 36, heretofore described.

It will be seen that by my invention I have provided a very simple lubricator for leaf springs adapted to use oil and similar lubricants, contained in a reservoir from which it cannot leak and be wasted, but from which it is regularly and automatically fed to the spring as required. The reservoir may be refilled by merely removing the plug 26, and the oilers may be readily mounted in position on the springs, or removed by merely fastening and unfastening the securing springs.

Having thus described my invention, what I claim is:

1. The combination with a leaf spring, of a device for lubricating the surfaces between the leaves of said spring comprising a reservoir, a conduit communicating with the surfaces to be lubricated and opening into the reservoir at a point below the surfaces to be lubricated, and a wick occupying the opening between the conduit and said reservoir and extending along said conduit.

2. The combination, with a leaf spring, of a device for lubricating the same comprising a conduit in communication with the surfaces to be lubricated, a reservoir into which said conduit opens at its lower end, and a wick occupying the opening between said conduit and the reservoir and extending upwardly along said conduit across the sides of the leaves.

3. The combination, with a leaf spring, of a device for lubricating the surfaces between the leaves, comprising a reservoir, a conduit leading upwardly from said reservoir and extending transversely of the sides of the leaves and communicating with the surfaces to be lubricated, and a wick extending into said reservoir through the opening leading to the conduit and extending upwardly along the conduit across said leaves.

4. A device of the class described, comprising a reservoir, a conduit extending upwardly from the same and having a vertical opening on one side adapted to extend transversely across and be closed by the sides of the leaves of a spring, and a wick member substantially filling said conduit and extending into said reservoir.

5. The combination, with a leaf spring, of a device for lubricating the same, comprising a reservoir for lubricant having an opening below the lower surface to be lubricated, a conduit extending across the sides of the leaves and communicating with the surfaces to be lubricated, and a wick extending into the reservoir substantially filling the opening and extending upwardly along said conduit in contact with the edges of the leaves.

6. The combination, with a leaf spring, of a device for lubricating the surfaces between the leaves, comprising a reservoir extending below the lower leaf, an open sided conduit leading upwardly from the reservoir transversely of the edges of the leaves having its open side contiguous with such edges, and a wick extending from the lower portion of the reservoir upwardly along said conduit, and removable means for holding the device with the wick member pressed against the sides of the leaves.

7. The combination, with a leaf spring, of a device for lubricating the surfaces between the leaves, comprising a reservoir, a conduit extending transversely of the sides of the leaves, a shoulder engaging the lower leaf, the upper end of the conduit having a closure, means for bringing oil from the reservoir to the surfaces to be lubricated, projecting members extending from the lower side of the reservoir beneath the spring and from the upper portion of said conduit, and yielding means engaging said projections for holding the device against the side of the spring.

8. The combination, with a leaf spring, of a device for lubricating the surfaces between the leaves, comprising a reservoir, a conduit extending transversely of the sides of the leaves, a reservoir extending under the lower leaf and having a shoulder engaging the same, the upper end of the conduit having a closure, said closure extending over the upper leaf and engaging the same, means for bringing oil from the reservoir to the surfaces to be lubricated, projecting members extending from the side of the reservoir beneath the spring and from said overhanging top portion, and means engaging said projections for holding the device against the side of the spring.

9. The combination, with a leaf spring, of a device for lubricating the same, comprising a reservoir, a conduit extending transversely of the leaves and communicating with the surfaces to be lubricated and with the reservoir through an opening below said surfaces, said reservoir extending above and below said opening, and a wick substantially filling said opening and substantially filling the conduit.

10. A device of the character described, comprising a reservoir, an upwardly extending conduit communicating with the reservoir at its lower end, said conduit having an open side adapted to stand contiguous with the sides of the leaves of the leaf spring, said reservoir having a portion extending upwardly past the lower edge of the lower leaf and having a partition within the same extending downwardly past this upwardly extending portion and spaced therefrom, leaving an opening leading to the conduit, and a wick substantially filling the opening and lying in the conduit.

11. The combination with a leaf spring, of devices for lubricating the same each comprising a reservoir for lubricant, an open sided conduit communicating with the reservoir and adapted to extend transversely of the leaves of a leaf spring, a wick in the reservoir and extending along said conduit, and projecting means extending from the reservoir and the conduit and a pair of springs adapted to engage said projecting means whereby said devices may be arranged on opposite sides of the leaf spring and held in position by said springs.

12. The combination with a leaf spring, of a device for lubricating the surfaces between its leaves, comprising a reservoir, a conduit communicating with the reservoir and extending transversely of the leaves and having an open side closed by the spring, a wick in said reservoir and conduit, and means including a coil spring for drawing the lubricating device to the side of the spring to hold the device in position.

13. The combination with a leaf spring, of a device for lubricating the surfaces between its leaves, comprising a reservoir, a conduit communicating with the reservoir and the surfaces to be lubricated, a wick in said reservoir and conduit, and means including a pair of coil springs and a member engaging one side of the leaf spring for drawing the lubricating device to the other side of the leaf spring to hold the device in position.

In testimony whereof, I hereunto affix my signature in the presence of a witness.

ALBERT MUSTEE.

Witness:
JUSTIN W. MACKLIN.